United States Patent [19]

Vacík et al.

[11] Patent Number: 4,916,197
[45] Date of Patent: Apr. 10, 1990

[54] HYDROPHILIC COPOLYMER AND THE METHOD FOR PRODUCING THEREOF

[75] Inventors: Jiří Vacík; Jana Kůdelková, both of Prague, Czechoslovakia

[73] Assignee: Ceskoslovenska akademie ved, Prague, Czechoslovakia

[21] Appl. No.: 376,697

[22] Filed: Jul. 7, 1989

[30] Foreign Application Priority Data

Jul. 8, 1988 [CS] Czechoslovakia ............. 4954-88

[51] Int. Cl.$^4$ ............................................. C08F 26/08
[52] U.S. Cl. .............................................. 526/264
[58] Field of Search ................................... 526/264

[56] References Cited

FOREIGN PATENT DOCUMENTS 54-127978 10/1979 Japan.

*Primary Examiner*—Joseph L. Schofer
*Assistant Examiner*—Alex H. Walker
*Attorney, Agent, or Firm*—Leydig, Voit & Mayer

[57] ABSTRACT

The solution pertains to a hydrophilic copolymer suitable in particular for contact and intraocular lenses and medical applications and to a method for its production.

The solution consists in a hydrophilic copolymer which can be prepared by copolymerization of 5 to 95 wt.-% 1-vinyl-2-pyrrolidone with 95 to 5 wt.-% alkylene glycol acetate methacrylates or acrylates of the general formula I

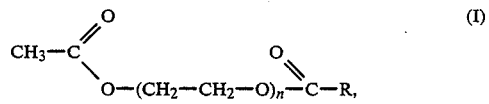

(I)

where R is the group $CH_2=CH-$ or $CH_2=C(CH_3)-$ and n means an integer 1 to 3, in the presence of 0.01 to 50 wt.-% of a crosslinking agent under the conditions of radical copolymerization in the presence of radical initiators.

11 Claims, No Drawings

HYDROPHILIC COPOLYMER AND THE METHOD FOR PRODUCING THEREOF

The invention pertains to a hydrophilic copolymer and the method of its production.

Various copolymers are known which are used for various medical purposes, production of contact lenses and other applications, but these copolymers mostly have insufficient mechanical properties or also an undesirable fraction of extractables.

The polymer of 2-hydroxyethyl methacrylate (HEMA) proved suitable for applications where good mechanical properties are stressed and the water content about 40 wt.-% is sufficient. Various polymeric materials were designed, for example, for manufacturing of soft contact lenses (U.S. Pat. Nos. 2,976,576; 3,220,960; 3,260,945; Brit. Patent no. 1,601,087). However, some applications require highly swelling materials having also a lower shear modules at sufficient elongation. For this purpose there were developed lightly crosslinked copolymers of a strongly hydrophilic 1-vinyl-2-pyrrolidone with alkyl methacrylate (Brit. Patent no. 1,514,810), which combine the more suitable mechanical properties with a high swelling capacity. They, however, contain an undesirable exctractable portion. In addition, methyl methacrylate has a high vapor pressure and this system cannot be therefore successfully used, for example, in centrifugal casting.

An object of the invention is a hydrophilic copolymer prepared by copolymerization of 5 to 95 wt.-% of 1-vinyl-2-pyrrolidone and 95 to 5 wt.-% of alkylene glycol acetate methacrylates or acrylates of the general formula I

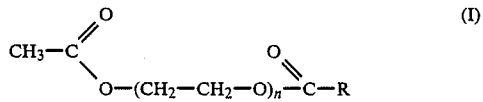

where R is the group $CH_2=CH-$ or $CH_2=C(CH_3)-$ and n is integer 1 to 3, in the presence of 0.01 to 50 wt.-% crosslinking agent under the conditions of radical copolymerization in the presence of radical initiators.

The hydrophilic copolymer particularly suitable for the preparation of soft contact and intraocular lenses can be prepared in the presence of 0.01 to 5 wt.-% of crosslinking agent. With the increasing content of the monomer with general formula I, the equilibrium content of water in the resulting copolymer in the swollen state decreases. The content of water in the resulting copolymer ranges from 5 to 95 wt.-%.

The crosslinking agent is advantageously selected from the group comprising multifunctional esters and amides of acrylic or methacrylic acid, preferably 3,3'-ethylidenebis(1-vinyl-2-pyrrolidone) or its mixtures with diesters of the corresponding alkylene glycols. This crosslinking agent reduces the percentage of water-soluble homopolymer of 1-vinyl-2-pyrrolidone.

The radical initiator may be selected from the group comprising azo compounds, peroxides, peroxocarbonates, persulfates, photoinitiators based on benzoin ethers and their derivatives, and also initiation redox systems, as persulfate-disulfite, persulfate-alkylamines, benzoyl peroxide-alkylamines.

The copolymerization may be also carried out in the presence of polar solvents, advantageously in the presence of glycerol, glycols and their derivatives, water, dimethylformamide, dimethylsulfoxide, dimethylacetamide, diacetine, 2-propanol or their mixtures.

In the presence of the said solvents or their mixture it is prepared the copolymer with the chosen content of solvent suitable for casting. The solvent used prevents from mechanical working but, on the other hand, it favourably influences the swelling pressures occurring at swelling of the final product.

The copolymerization may be carried out at the same time with molding. Contact or intraocular lenses may be advantageously produced in this way.

If the copolymerization is carried out in the absence of solvents, the obtained bulk copolymer may be successively mechanically processed or some articles can be directly manufactured by this polymerization in bulk.

It is also possible and, in the case of production of highly-swelling turned contact lenses even advantageous, to extract the solvent or also the water-soluble low-molecular weight portions present in the crosslinked copolymer prepared in the presence of above mentioned polar solvents with water and then to dry the copolymer to constant weight. The drying can be advantageously carried out in the medium of saturated steam above the glass-transition temperature $T_g$ of the prepared copolymer.

An advantage of this procedure, in comparison with the so far used method for preparation of contact lenses from various types of xerogels, consists not only in the possibility to wash out perfectly the low-molecular weight components, but also in the more ordered structure with respect to the inner stress of cross linkages achieved during polymerization. This structure is retained during drying and reswelling of the contact lens produced from the xerogel prepared in this way as a consequence of the ordered structure of cross linkages giving the network without inner stress.

Another advantage of this method is that the glass-transition temperature $T_g$ increases with each percent of washed out monomer and low-molecular weight components which fact has a favourable effect on turning and polishing of the final shape of contact lens.

The hydrophilic copolymers according to the invention have good mechanical properties even at a high swelling capacity, contain the minimum amount of water-soluble extracts, are resistant towards undesirable deposits, are stable at temperature of boiling water (for example, in the sterilization of lenses), secures a sufficiently high content of water, etc.

The invention is further illustrated in the examples of performance without limiting its scope to these examples only.

EXAMPLE 1

A mixture consisting of 80 wt.-% 1-vinyl-2-pyrrolidone and 20 wt.-% 2-(acetyloxy)ethyl methacrylate was mixed in the amount of 99.7 wt.-% with 0.3 wt.-% 3,3'-ethylidene-bis-(1-vinyl-2-pyrrolidone). This mixture was polymerized with 0.05 wt.-% azo-bis-isobutyronitrile related to the total amount of monomers for 16 hours at 60° C. The resulting copolymer contained after swelling 83 wt.-% water.

EXAMPLE 2

A mixture consisting of 70 wt.-% 1-vinyl-2-pyrrolidone and 30 wt.-% 2-(acetyloxy)ethyl methacrylate was mixed in the amount of 99.7% with 0.3 wt.-% 3,3'- ethylidene-bis-(1-vinyl-2-pyrrolidone). This mixture was polymerized with 0.05 wt.-% azo-bis-isobutyronitrile related to the total amount of monomers for 16 hours at 60° C. The resulting copolymer contained after swelling 77.5 wt.-% water and had $G=0.0681$ MPa, $\tau=0.15$ MPa, and $\epsilon=130\%$. ($G=$modulus of elasticity, $\epsilon=$elongation, $\tau=$shear stress).

EXAMPLE 3

A mixture consisting of 60 wt.-% 1-vinyl-2-pyrrolidone and 40 wt.-% 2-(acetyloxy)ethyl methacrylate was mixed in the amount of 99.7 wt.-% with 0.3 wt.-% 3,3'-ethylidene-bis-(1-vinyl-2-pyrrolidone). This mixture was polymerized with 0.05 wt.-% azo-bis-isobutyronitrile related to the total amount of monomers for 16 hours at 60° C. The resulting copolymer contained after swelling 68.4 wt.-% water and had $G=0.1123$ MPa, $\tau=0.18$ MPa, and $\epsilon=120\%$.

EXAMPLE 4

A mixture consisting of 50 wt.-% 1-vinyl-2-pyrrolidone and 50 wt.-% 2-(acetyloxy)ethyl methacrylate was mixed in the amount of 99.7 wt.-% with 0.3 wt.-% 3,3'-ethylidene-bis-(1-vinyl-2-pyrrolidone). This mixture was polymerized with 0.05 wt.-% azo-bis-isobutyronitrile related to the total amount of monomers for 16 hours at 60° C. The resulting copolymer contained after swelling 58.8 wt.-% water and had $G=0.1172$ MPa, $\tau=0.18$ MPa, and $\epsilon=93\%$.

EXAMPLE 5

A mixture consisting of 80 wt.-% 1-vinyl-2-pyrrolidone and 20 wt.-% 2-(2-acetyloxyethoxy)ethyl methacrylate was mixed in the amount of 99.9 wt.-% with 0.1 wt.-% 3,3'-ethylidene-bis-(1-vinyl-2-pyrrolidone). This mixture was polymerized with 0.1 wt.-% azo-bis-isobutyronitrile related to the total amount of monomers for 16 hours at 60° C. The resulting copolymer contained after swelling 91.2 wt.-% water.

EXAMPLE 6

A mixture consisting of 70 wt.-% 1-vinyl-2-pyrrolidone and 30 wt.-% 2-(acetyloxyethoxy)ethyl methacrylate was mixed in the amount of 99.7 wt.-% with 0.3 wt.-% 3,3'-ethylidene-bis-(1-vinyl-2-pyrrolidone). This mixture was polymerized with 0.1 wt.-% diisopropyl peroxocarbonate related to the total amount of monomers for 16 hours at 60° C. The resulting copolymer contained after swelling 84.6 wt.-% water.

EXAMPLE 7

A mixture consisting of 60 wt.-% 1-vinyl-2-pyrrolidone and 40 wt.-% 2-(acetyloxyethoxy)ethyl methacrylate was mixed in the amount of 99.7 wt.-% with 0.3 wt.-% ethylene glycol dimethacrylate. This mixture was polymerized with 0.1 wt.-% azo-bis-isobutyronitrile related to the total amount of monomers for 16 hours at 60° C. The resulting copolymer contained after swelling 80.5 wt.-% water.

EXAMPLE 8

A mixture consisting of 50 wt.-% 1-vinyl-2-pyrrolidone and 50 wt.-% 2-(acetyloxyethoxy)ethyl methacrylate was mixed in the amount of 99.7 wt.-% with 0.3 wt.-% 3,3'-ethylidene-bis-(1-vinyl-2-pyrrolidone). This mixture was polymerized with 0.1 wt.-% azo-bis-isobutyronitrile related to the total amount of monomers for 16 hours at 60° C. The resulting copolymer contained after swelling 73.3 wt.-% water.

EXAMPLE 9

A mixture consisting of 60 wt.-% 1-vinyl-2-pyrrolidone and 40 wt.-% 2-(acetyloxyethoxy)ethyl methacrylate was mixed in the amount of 99.7 wt.-% with 0.3 wt.-% 3,3'-ethylidene-bis-(1-vinyl-2-pyrrolidone).

A solution containing 80 wt.-% of this mixture in diacetine was prepared and polymerized with 0.05 wt.-% azo-bis-isobutyronitrile related to the total amount of monomers for 16 hours at 60° C. The resulting copolymer contained after swelling 71.8 wt.-% water.

EXAMPLE 10

A mixture consisting of 60 wt.-% 1-vinyl-2-pyrrolidone and 40 wt.-% 2-(2-acetyloxyethoxy)ethyl methacrylate was mixed in the amount of 98.5 wt.-% with 1.5 wt.-% diethylene glycol dimethacrylate. A solution containing 80 wt.-% of this mixture in diacetine was prepared and polymerized with 0.05 wt.-% azo-bis-isobutyronitrile related to the total amount of monomers for 16 hours at 60° C. The resulting copolymer contained after swelling 61 wt.-% water.

EXAMPLE 11

A mixture consisting of 60 wt.-% 1-vinyl-2-pyrrolidone and 40 wt.-% 2-(acetyloxybisethoxy)ethyl methacrylate was mixed in the amount of 99.7 wt.-% with 0.3 wt.-% ethylene glycol dimethacrylate. The mixture was polymerized with 0.05 wt.-% azo-bis-isobutyronitrile related to the total amount of monomers for 16 hours at 60° C. The resulting copolymer contained after swelling 88.2 wt.-% water.

EXAMPLE 2

A mixture consisting of 95 wt.-% 1-vinyl-2-pyrrolidone and 5 wt.-% 2-(2-acetyloxyethoxy)ethyl methacrylate was mixed in the amount 99.7 wt.-% with 0.3 wt.-% 3,3'-ethylidene-bis-(1-vinyl-2-pyrrolidone). The mixture was polymerized with 0.05 wt.-% azo-bis-isobutyronitrile related to the total amount of monomers for 16 hours at 60° C. The resulting copolymer contained after swelling 92.3 wt.-% water.

EXAMPLE 13

A mixture consisting of 60 wt.-% 1-vinyl-2-pyrrolidone and 40 wt.-% 2-(acetyloxy)ethyl methacrylate was mixed in the amount of 98 wt.-% with 2 wt.-% 3,3'-ethylidene-bis-(1-vinyl-2-pyrrolidone). The mixture was polymerized with 0.1 wt.-% azo-bis-isobutyronitrile related to the total amount of monomers for 16 hours at 60° C. The resulting copolymer contained after swelling 58.6 wt.-% water.

EXAMPLE 14

A mixture consisting of 60 wt.-% 1-vinyl-2-pyrrolidone and 40 wt.-% 2-(acetyloxy)ethyl methacrylate was mixed in the amount of 50 wt.-% with 50 wt.-% 3,3'-ethylidene-bis-(1-vinyl-2-pyrrolidone). The mixture was polymerized with 0.05 wt.-% azo-bis-isobutyronitrile related to the total amount of monomers for 16 hours at 60° C. The resulting copolymer contained after swelling 5.3 wt.-% water.

EXAMPLE 15

A mixture consisting of 60 wt.-% 1-vinyl-2-pyrrolidone and 40 wt.-% 2-(acetyloxy)ethyl acrylate was mixed in the amount of 99.7 wt.-% with 0.3 wt.-% diethylene glycol dimethacrylate. The mixture was polymerized with 0.1 wt.-% diisopropyl peroxocarbonate for 16 hours at 60° C. The swollen copolymer contained 85.2 wt.-% water.

EXAMPLE 16

A mixture consisting of 70 wt.-% 1-vinyl-2-pyrrolidone and 30 wt.-% 2-(2-acetyloxyetoxy)ethyl methacrylate was mixed in the amount of 99.7 wt.-% with 0.3 wt.-% ethylene glycol dimethacrylate. The mixture was polymerized with 0.5 wt.-% benzoin ethyl ether related to the total amount of monomers for 15 min of UV irradiation. The swollen copolymer contained 83.3 wt.-% water.

EXAMPLE 17

A mixture consisting of 60 wt.-% 1-vinyl-2-pyrrolidone and 40 wt.-% 2-(acetyloxy)ethyl methacrylate was mixed in the amount of 99.5 wt.-% with 0.5 wt.-% 3,3'-ethylidene-bis-(1-vinyl-2-pyrrolidone). The mixture was polymerized with 0.5 wt.-% benzoin ethyl ether related to the total amount of monomers for 15 min by UV irradiation. The swollen copolymer contained 85.1 wt.-% water.

EXAMPLE 18

A mixture consisting of 80 wt.-% 1-vinyl-2-pyrrolidone and 20 wt.-% 2-(acetyloxy)ethyl methacrylate was mixed in the amount of 99.5 wt.-% with 0.5 wt.-% ethylene glycol dimethacrylate. A solution containing 80% of this mixture in N-methylpyrrolidone was polymerized with 0.5 wt.-% benzoin ethyl ether related to the total amount of monomers for 15 min by UV irradiation. The swollen copolymer contained 80.8 wt.-% water.

EXAMPLE 19

A mixture consisting of 40 wt.-% 1-vinyl-2-pyrrolidone and 60 wt.-% 2-(2-acetyloxyethoxy)ethyl methacrylte was mixed in the amount of 99.7 wt.-% with 0.3 wt.-% 3,3'-ethylidene-bis-(1-vinyl-2-pyrrolidone). The mixture was polymerized with 0.05 wt.-% azo-bis-isobutyronitrile related to the total amount of monomers for 16 hours at 60° C. The resulting copolymer contained after swelling 69% water.

EXAMPLE 20

A mixture consisting of 45 wt.-% 1-vinyl-2-pyrrolidone and 55 wt.-% 2-(2-acetoxyethoxy)ethyl methacrylate was mixed in the amount 99.7 wt.-% with 0.3 wt.-% 3,3'-ethylidene-bis-(1-vinyl-2-pyrrolidone). The mixture was polymerized with 0.05 wt.-% azo-bis-isobutyronitrile related to the total amount of monomers for 16 hours at 60° C. The resulting copolymer contained after swelling 56.5 wt.-% water.

EXAMPLE 21

A mixture consisting of 30 wt.-% 1-vinyl-2-pyrrolidone and 70 wt.-% 2-(acetyloxy)ethyl methacrylate was mixed in the amount of 99.7 wt.-% with 0.3 wt.-% 3,3'-ethylidene-bis-(1-vinyl-2-pyrrolidone). The mixture was polymerized with 0.5 wt.-% benzoin ethyl ether for 15 min by UV irradiation. The swollen copolymer contained 45 wt.-% water.

EXAMPLE 22

A mixture consisting of 30 wt.-% 1-vinyl-2-pyrrolidone and 70 wt.-% 2-(acetyloxy)ethyl methacrylate was mixed in the amount of 99.7 wt.-% with 0.3 wt.-% 3,3'-ethylidene-bis-(1-vinyl-2-pyrrolidone). This mixture was polymerized with 0.1 wt.-% azo-bis-isobutyronitrile related to the total amount of monomers for 16 hours at 60° C. The resulting copolymer contained after swelling 37 wt.-% water.

EXAMPLE 23

A mixture consisting of 20 wt.-% 1-vinyl-2-pyrrolidone and 80 wt.-% 2-(acetyloxy)ethyl methacrylate was mixed in the amount of 99.7 wt.-% with 0.3 wt.-% 3,3'-ethylidene-bis-(1-vinyl-2-pyrrolidone). This mixture was polymerized with 0.1 wt.-% azo-bis-isobutyronitrile related to the total amount of monomers for 16 hours at 60° C. The resulting copolymer contained after swelling 60 wt.-% water.

EXAMPLE 24

A mixture consisting of 10 wt.-% 1-vinyl-2-pyrrolidone and 90 wt.-% 2-(acetyloxyetoxy)ethyl methacrylate was mixed in the amount of 99.7 wt.-% with 0.3 wt.-% 3,3'-ethylidene-bis-(1-vinyl-2-pyrrolidone). This mixture was polymerized with 0.05 wt.-% azo-bis-isobutyronitrile related to the total amount of monomers for 16 hours at 60° C. The resulting copolymer contained in the swollen state 56 wt.-% water.

EXAMPLE 25

A mixture consisting of 10 wt.-% 1-vinyl-2-pyrrolidone and 90 wt.-% 2-(acetyloxy)ethyl methacrylate was mixed in the amount of 99.7 wt.-% with 0.3 wt.-% 3,3'-ethylidene-bis-(1-vinyl-2-pyrrolidone). This mixture was polymerized with 0.5 wt.-% benzoin ethyl ether related to the total amount of monomers for 15 min by UV irradiation. The swollen copolymer contained 29 wt.-% water.

EXAMPLE 26

A mixture consisting of 5 wt.-% 1-vinyl-2-pyrrolidone and 95 wt.-% 2-(acetyloxyethoxy)ethyl methacrylate was mixed in the amount of 99.7 wt.-% with 0.3 wt.-% 3,3'-ethylidene-bis-(1-vinyl-2-pyrrolidone). The mixture was polymerized with 0.1 wt.-% azo-bis-isobutyronitrile related to the total amount of monomers at 60° C. for 16 hours. the swollen copolymer contained 54 wt.-% water.

We claim:
1. Hydrophilic copolymer prepared by copolymerization of 5 to 95 wt.-% of 1-vinyl-2-pyrrolidone with 95 to 5 wt.-% of alkylene glycol acetate methacrylate or acrylate of formula I,

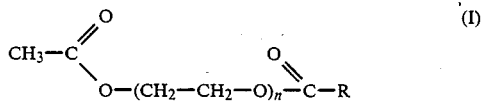

where R is the group $CH_2=CH-$ or $CH_2=C(CH_3)-$ and n is an integer of 1 to 3, in the presence of 0.01 to 50 wt.-% crosslinking agent total monomer basis.

2. The hydrophilic copolymer according to claim 1 for the preparation of contact and intraocular lenses, by copolymerization of 5 to 95 wt.-% 1-vinyl-2-pyrrolidone with 95 to 5 wt.-% of alkylene glycol acetate, methacrylate or acrylate of formula I, claim 1, in the presence of 0.01 to 5 wt.-% of a cross-linking agent total monomer basis.

3. The hydrophilic copolymer according to claim 1, wherein the crosslinking agent comprises multifunctional esters or amides of acrylic or methacrylic acid, 3,3'-ethylidene-bis-(1-vinyl-2-pyrrolidone) or alkylene glycol diester mixtures.

4. The hydrophilic copolymer according to claim 1, wherein the radical initiators comprise azo compounds, peroxides, peroxocarbonates, persulfates, photoinitiators based on benzoin ethers or redox systems, persulfate-bisulfite, persulfate-alkylamine, benzoyl peroxide-alkylamine.

5. The hydrophilic copolymer according to claim 1 wherein thecopolymerization is carried out in polar solvents, glycerol, glycols and derivatives, water, isopropanol, and mixtures thereof.

6. The hydrophilic copolymer according to claim 2, wherein the crosslinking agent comprises malfunctional esters or amides of acrylic or methacrylic acid, 3,3'-ethylidene-bis-(1-vinyl-2-pyrrolidone) or alkylene glycol diester mixtures.

7. The hydrophilic copolymer according to claim 2 wherein the radical initiators comprise azo compounds, peroxides, peroxocarbonates, persulfates, photoinitiators based on benzoin ethers or redox systems, persulfate-bisulfite, persulfate-alkylamine, benzoyl peroxide-alkyl amine.

8. The hydrophilic copolymer according to claim 3 wherein the radical initiators comprise azo compounds, peroxides, peroxocarbonates, persulfates, photoinitiators based on benzoin ethers, or redox systems, advantageously persulfate-disulfite, persulfate-alkylamines, benzoyl peroxide-alkylamines.

9. The hydrophilic copolymer according to claim 2 wherein the radical copolymerization is carried out in polar solvents, glycerol, glycols and, water, isopropanol and mixtures thereof.

10. The hydrophilic copolymer according to claim 3 wherein the radical polymerization is carried out polar solvents glycerol, glycols and water, isopropanol and mixtures thereof.

11. The hydrophilic copolymer according to claim 4 wherein the radical copolymerization is carried out in polar solvents glycerol, glycols and water, isopropanol and mixtures thereof.

* * * * *